Figure 1:
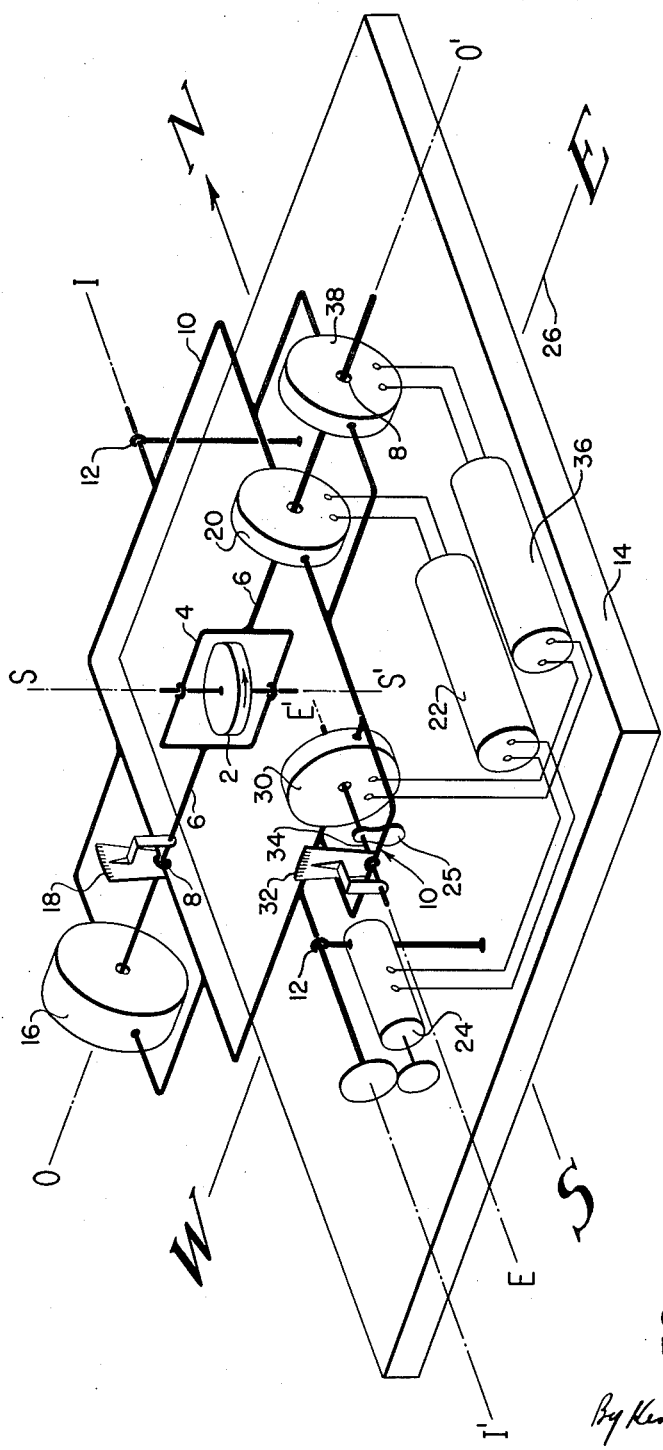

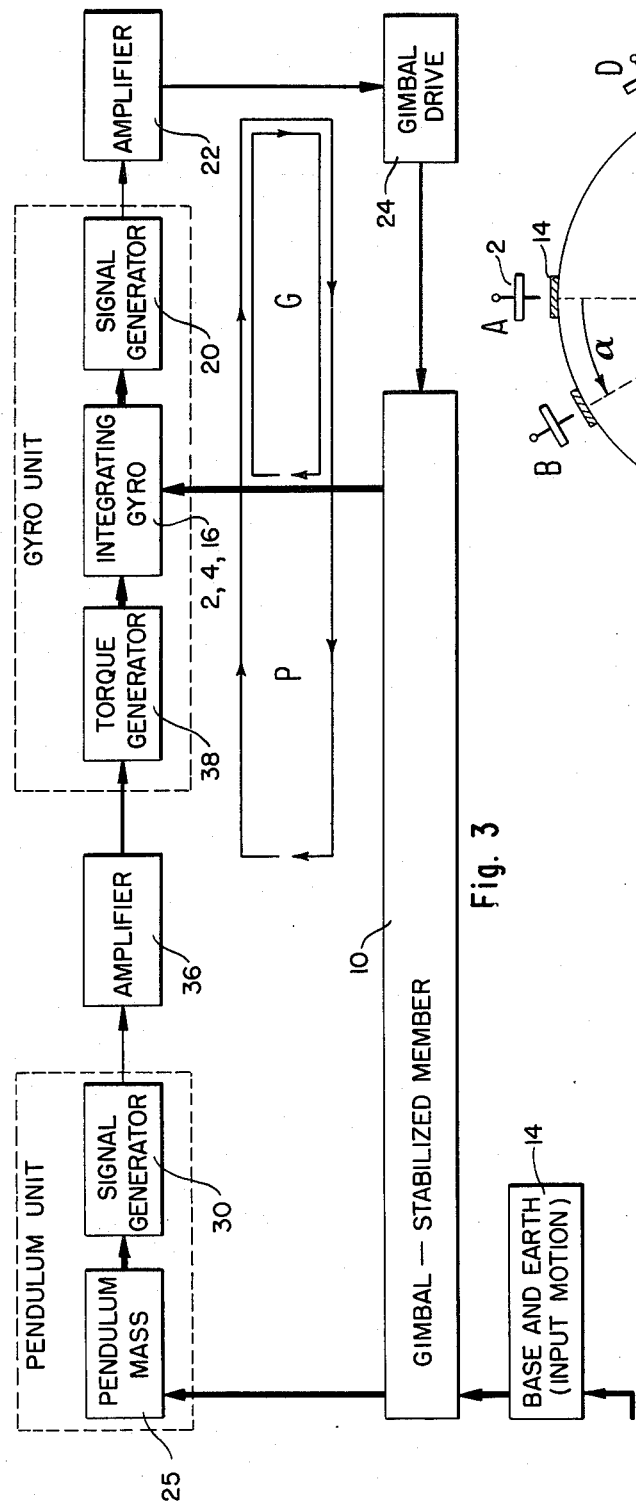
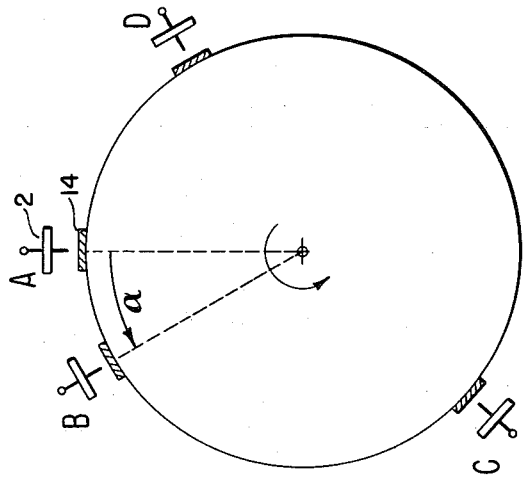
Fig. 2
Fig. 3
INVENTORS
CHARLES S. DRAPER
ROGER B. WOODBURY
ATTORNEYS July 3, 1956  C. S. DRAPER ET AL  2,752,792
GYROSCOPIC APPARATUS Filed March 22, 1951  5 Sheets-Sheet 4

INVENTORS
CHARLES S. DRAPER
ROGER B. WOODBURY

By Kenway Jenney Witter
& Hildreth

ATTORNEYS

INVENTORS
CHARLES S. DRAPER
ROGER B. WOODBURY

United States Patent Office 2,752,792
Patented July 3, 1956

2,752,792
GYROSCOPIC APPARATUS

Charles S. Draper, Newton, and Roger B. Woodbury, Belmont, Mass., assignors, by mesne assignments, to Research Corporation, New York, N. Y., a corporation of New York Application March 22, 1951, Serial No. 216,947

21 Claims. (Cl. 74—5.34)

The present invention relates to gyroscopically controlled apparatus, and is particularly concerned with apparatus for accurately controlling the angular motion of a body about a certain reference axis or axes, as for example, in navigational instruments.

The copending application of Draper, Hutzenlaub and Woodbury Serial No. 216,946 filed March 22, 1951, describes a gyroscopic system utilizing one or more single-degree-of-freedom gyros together with servo means whereby the position of a so-called reference or controlled member may be accurately maintained in inertial space.

The object of the present invention is to provide gyroscopic apparatus by which a member may be maintained in fixed position relative to some reference axis other than inertial space, for example, to maintain a member fixed with respect to gravity, the earth's magnetic field, the sun, or some other reference.

With the foregoing object in view, the present invention makes use of single-degree-of-freedom gyros of the type described in the above-mentioned copending application, said gyros being substantially free of elastic restraint about the output axes, and having means for generating a resisting or restraining torque proportional to the rate of deflection about their output axes. Such a gyro is referred to as an "integrating" gyro because the effect of the viscous-type restraint is to integrate the input angular velocity and cause the gyro output deflection to be proportional to the angular deviation about the input axis. Further, as described in the above copending application, there is provided servo means operating on the controlled element, and actuated by an instantaneous deflection of the gyro, in a manner to tend to restore the gyro to its neutral or null position in its suspension. The principal feature of the present invention is the application of an orientational control torque to cause the controlled element to hold a position with respect to any desired reference axis. The invention provides means for detecting orientational deviations of slight magnitude from the reference axis, together with servo-controlled means for applying control torques (in addition to the viscous damping torque) about the output axes of such a gyro stabilization system whereby the member is isolated from movements of its support and maintained in its reference position.

Examples of devices which may be constructed by means of the present invention, are stable verticals, compasses controlled by the earth's magnetic field, gyro compasses, and in fact any system in which an external reference may be utilized to establish a reference axis from which deviations of the controlled element may be detected in order to actuate the appropriate servomechanism.

Figure 4:
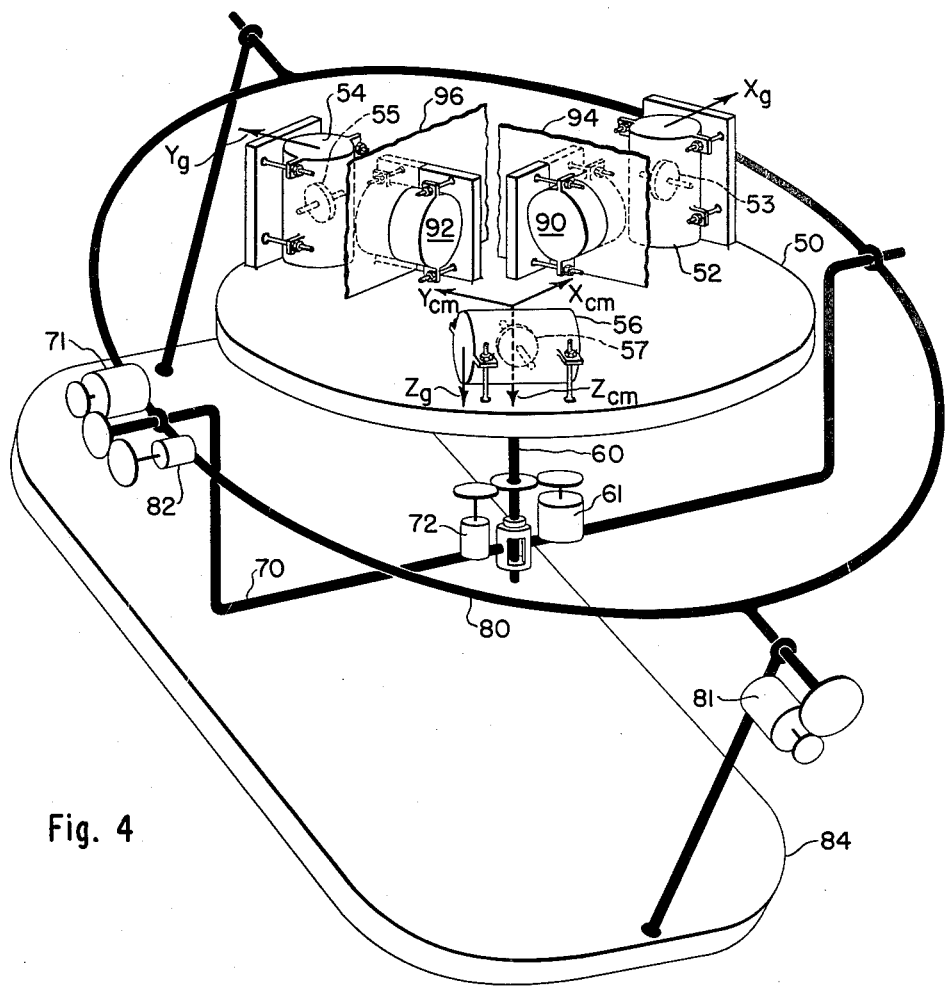
Figure 5:
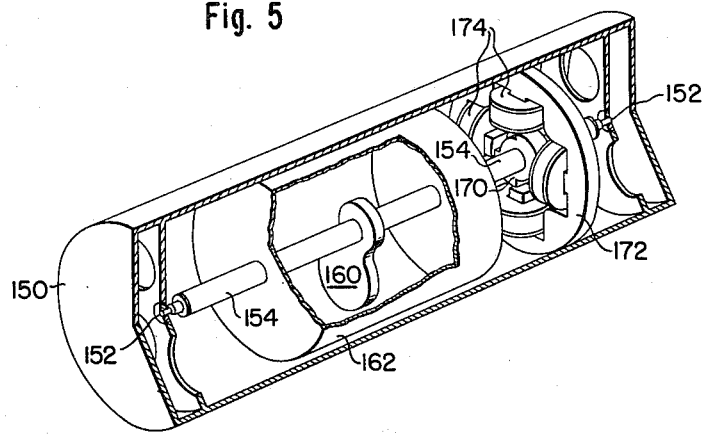
Figure 6:
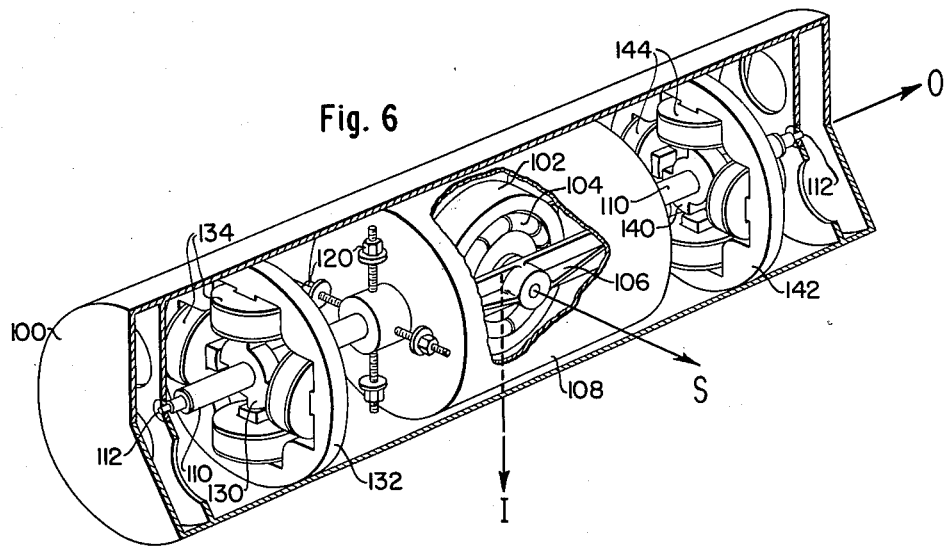
Figure 7:
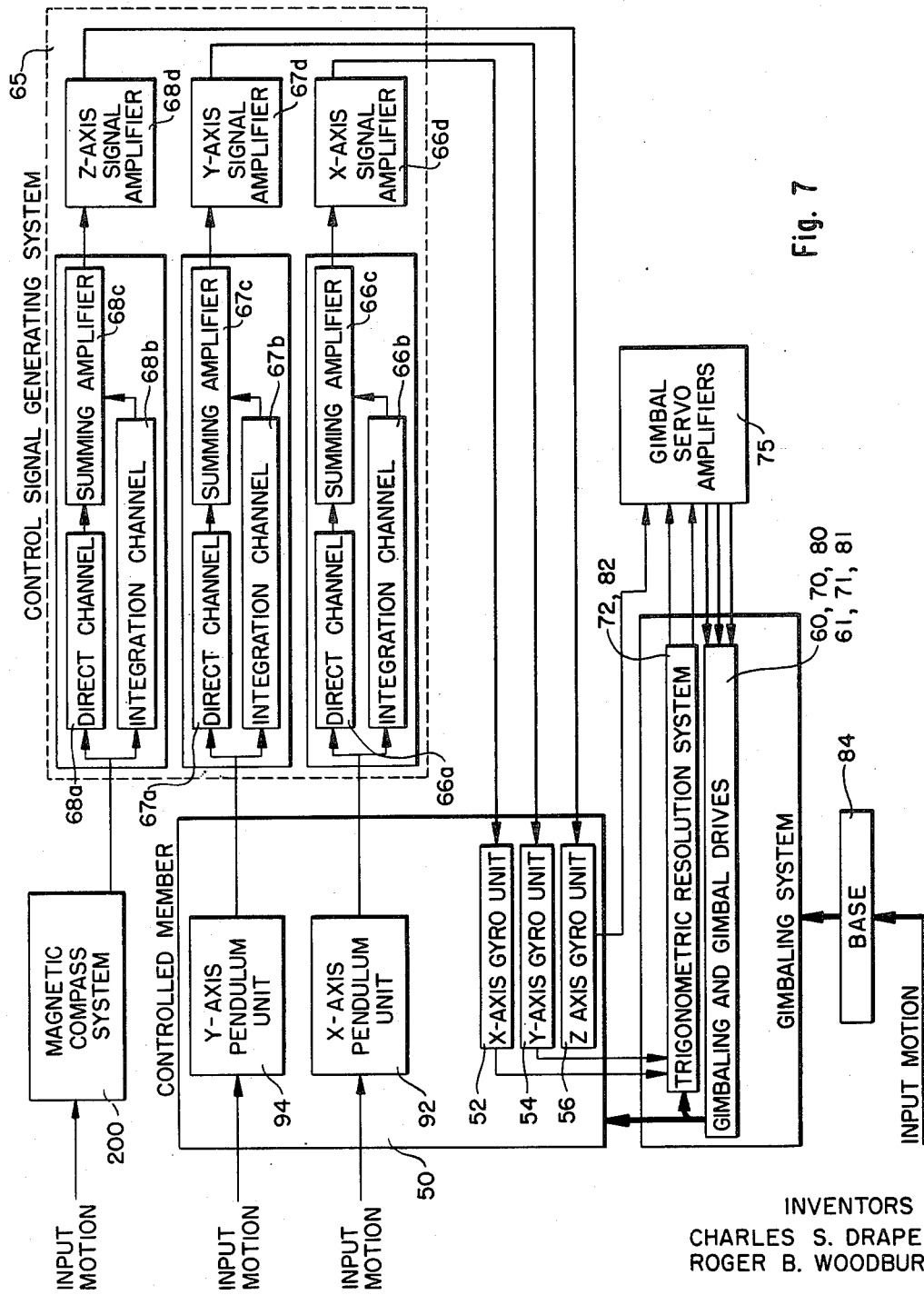

In the accompanying drawings Fig. 1 is a schematic diagram of an illustrative embodiment of the present invention; Fig. 2 illustrates the operation of the embodiment of Fig. 1; Fig. 3 is a functional or block diagram of the components of Fig. 1, showing their electrical and mechanical interrelation; Fig. 4 is a schematic diagram of a stable vertical constructed according to the present invention; Fig. 5 is a cutaway view of one of the pedulum units used in the stable vertical of Fig. 4; Fig. 6 is a cutaway view of a gyro unit used in the present invention; Fig. 7 is a functional or block diagram showing the mechanical and electrical interrelation of the components of Fig. 4.

The present invention utilizes the principles of the stabilization system described in said copending application and combines with that system means for detecting deviations from a reference axis and means for applying appropriate control torques to the gyroscopes to cause them to isolate the system from deviations with respect to the reference axes.

The present invention will be illustrated and described as embodied in a stable vertical.

It is convenient to refer to the special case of one gyro unit situated at the earth's equator, as an example. The reference axis to which stabilization will be made is the vertical at that point on the earth's surface; that axis will rotate with the earth in respect to inertial space. The detector of deviations is a single-degree-of-freedom pendulum. Such a system is shown in Fig. 1. The system is mounted on a base 14 and includes a gyro rotor 2 with its spin axis SS' mounted to spin in the inner member 4. The inner member on its shafts 6 rotates in the bearings 8 mounted on the outer or stabilized member 10. Such rotations are resisted by the damping member 16, and registered by the dial 18 or signal generator 20. The outer member 10 is journaled in bearings 12 and driven by a servo drive 24 which is activated by the amplifier 22, in turn activated by the signal generator 20, which is preferably of the type described in U. S. Patent No. 2,488,734 issued to Mueller, November 22, 1949.

This much of the system of Fig. 1, is the same as the system described in the above mentioned copending application of Draper, Hutzenlaub and Woodbury, and its operation is there fully described. It suffices to say here, that the inner member 4 will deflect an amount proportional to the deflection of the outer gimbal about the input axis II'. It thereby acts as a detector of motion of the outer gimbal with respect to inertial space. The signal generator 20 produces an electrical signal proportional to the deflections of the inner member with respect to the outer member and that signal through the amplifier 22 activates the servo drive 24 to move the stabilized member 10 so as to null the gyro deflection and signal. In this way the member 10 is stabilized in inertial or "fixed" space. A more detailed explanation may be obtained from the above-mentioned application.

The system shown here in Fig. 1 combines an orientational control system with the system of the above-mentioned application. A torque generator shown schematically at 38 has been added to the gyro output axis. The torque generator is a component like the signal generator 20 in configuration but with wiring changes as described in the Mueller patent cited above. It generates a torque proportional to the signal input supplied from the servo amplifier 36. The signal input to the amplifier 36 is received from a signal generator 30 like the signal generator 20, which generates a voltage proportional to angular deflections of the shaft 34, mounted in bearings on the controlled outer member 10. Rigidly connected to the shaft 34 is a pendulous mass 25 free to swing only about its input axis EE'. The pendulous mass 25 hangs vertically, and the signal generator 30 is so set that initially (when the gravitational vertical coincides with the desired vertical axis of the controlled member 10) it produces a zero output. The pendulous mass 25 will follow the gravitational vertical. If the controlled member 10 deviates from the horizontal, an angle will appear on the dial 32 and a voltage output from the signal generator 30.

It was shown in the copending application Serial No. 216,946 how, when the earth rotates, the gyro unit is held fixed in inertial space by the feedback loop comprising the gyro 2, the signal generator 20 and servo drive 24. (See Fig. 4 of that application.) If the connections to the torque generator 38 were broken the gyro would be fixed as shown there in Fig. 3. In such a case when the earth rotated through an angle α, the pendulous mass, retaining its fix to the vertical, would hang at an angle α from the vertical axis of the member 32. The signal generator 30 would be generating a voltage proportional to α. If the torque generator 38 were then re-connected, it would twist the gyro 2 and inner member 4 about the axis OO'. It would make it appear to the gyro signal generator 20, as if the controlled member 10 had been rotated in inertial space about its input axis II'. The signal generator 20 would therefore activate the servo drive 24 to nullify the deflection of the gyro 2 caused by the torque generator 38. The servo would drive the stabilized member 10 counterclockwise about the axes II' and EE' until the member's vertical axis was parallel to the pendulum vertical, and there was no more output from the signal generator 30, and hence no more torque from the torque generator 38 and no more deflection about the axis OO'. As shown in Fig. 3 there is in effect a feedback loop comprising the pendulous mass 25 detecting a deviation of the member 10 from the horizontal, the signal generator 30, the amplifier 36, the torque generator 38, the signal generator 20 and the servo drive 24, which moves the member 10 so as to nullify the error signal. This is the pendulum loop designated P. In practice the loop is not broken, as in the above-description; the torque generator continually "twists" the gyro unit's "memory" of inertial space to conform to an earth-vertical space. Thus as the earth rotates the gyro is continually held to the vertical as in Fig. 2.

It might seem at first that the gyro could be dispensed with for stabilization to the vertical, and that the amplifier 36 could drive the gimbal drive 24 directly. However, for practical operation the gyro unit is essential. As will be explained below, in order to utilize the pendulum reaction to non-gravitational accelerations, its period is made very long, of the order of an hour. Consequently, if the navigational device were mounted in an aircraft, the pendulum would not stabilize at all for the short-period pitches and rolls of the aircraft. If the pendulum period were made short enough to correct for these effects, the controlled member would swing about as the pendulum would with any short-period accelerations of the aircraft. Thus, two loops are needed to stabilize the member to the vertical; one is the loop G including the gyro 2, gyro signal generator 20, servomotor 24 and controlled member 10. Loop G has a short period (preferably of the order of 1/15 of a second) and isolates the controlled member 10 from all motion of the base 14. The other loop is the loop P including the pendulum 25, pendulum signal generator 30, gyro torque generator 38, the gyro 2, gyro signal generator 20, servomotor 24 and controlled member 10. It is given electrically a longer period and causes the controlled member to track the vertical.

The interrelation of these two loops is best seen by an inspection of Fig. 3 which shows the mechanical and electrical interrelation of the components of Fig. 1. In Fig. 3, heavy lines are used to denote rigid or semi-rigid mechanical couplings, medium lines to show power-level mechanical or electrical connections and light lines to show signal-level electrical connections. Fig. 3 may be compared with Fig. 4 of the above-mentioned copending application where the same convention has been followed and similar numbering used. Fig. 3 of that application shows the mechanical and electrical interrelation of the components of Fig. 1 of that application and the connection between Fig. 1 of that application and Fig. 1 of this has already been explained.

It can be seen readily that the components of Fig. 3 included in loop G of that drawing, namely the gyro assembly 2, 4 and 16, the gyro signal generator 20, the amplifier 22, gimbal drive 24 and the outer gimbal or stabilized member 10, comprise the loop of Fig. 3 of the copending application of Draper, Hutzenlaub and Woodbury. The operation of that loop is relatively rapid and will isolate the member 10 from motion of the base 14, holding that member fixed in inertial space.

Loop P acts as a control on loop G. Loop P detects deviations of the member 10 from the vertical, by means of the pendulum mass 25, and through the signal generator 30, amplifier 36 and the torque generator 38 twists the gyro assembly 2, 4 and 16, thereby causing the signal generator 20 to emit a signal. This signal actuates the gimbal drive 24 to move the stabilized member 10 until the signal is nulled, that is, until the deviation from the vertical is corrected for.

The relation between the two loops may be seen another way. The action of the servo drive is to rotate the member 10 and gyro about the gyro input axis so as to fix the gyro's output shaft 6 with respect to the member 10. Therefore, the control torque on the shaft must be balanced by a torque from a rotation of the member 10 about the input axis. The velocity of this rotation is, for balance, proportional to the control torque; the angle of rotation is therefore proportional to the time-integral of the torque.

A single pendulum unit is enough only in such a special case as that described above. An apparatus to stabilize to the vertical at all points on the earth's surface is shown in Fig. 4. Fig. 4 shows three gyroscopic units 52, 54 and 56 for X-, Y- and Z-axes respectively, mounted on a table 50 which is here considered the "controlled member." The gyro rotors are indicated at 53, 55 and 57 and their input axes by $X_g$, $Y_g$, and $Z_g$. The stabilized member 50 rests on an inner gimbal or shaft 60, driven by a drive motor 61. The inner gimbal assembly is supported by the middle gimbal 70 which is controlled by its angle resolver 72 and drive motor 71, all held in turn by the outer gimbal 80 controlled by its angle resolver 82 with its drive motor 81. The outer gimbal assembly rests on a base 84 which is attached through shock absorbers to the vehicle or other member on which it is desired to provide a stable vertical. The X-, Y- and Z-axes of the stabilized or controlled member are indicated at $X_{cm}$, $Y_{cm}$, and $Z_{cm}$. It will be seen that the arrangement of Fig. 4 is the same as that for stabilization in inertial space as shown in Fig. 5 of the above-mentioned copending application except that the pendulum units 90 and 92 with input planes 94 and 96 have been added.

The operation of the system of Fig. 4 in the absence of the pendulum units is fully described in the copending application of Draper and Woodbury. It suffices to say here that each of the gyros is sensitive to deflections about its input axis; since these input axes form a set of orthogonal coordinates any motion of the stabilized member 50 is resolved into its components; these components of the motion are detected by the gyros, converted into electric signals and resolved, to actuate the servo drives so as to move the stabilized member until the deflection is nullified. The pendulum units 90 and 92 act as detectors of deviations from the vertical. The vertical (or the horizontal) at any point on the earth's surface will vary in its direction in fixed space as the earth rotates and will further vary as the base 84 is moved over the earth's surface, as, for example, when it is carried in a vehicle.

Fig. 5 shows the preferred form of pendulum unit. It consists of two parts, a pendulous section and a signal generator in a case 150. The pendulous section consists of a pendulous mass 160 with only one degree of freedom, rotation about the axis of the shaft 154 on which it is mounted. The pendulous mass 160 is fixed to a float 162 in a viscous fluid (not shown) which surrounds the float and fills the case 150. The float wall is only a few hundredths of an inch away from the case wall, but the fluid acts both as a damper and as a bath in which the float 162 is suspended; in this way, bearing friction is greatly reduced. The signal generator consists of a rotor 170 and stator 172 with windings 174 which deliver an output signal proportional to the displacement of the rotor from its normal position with respect to the stator, preferably of the type described in U. S. Patent No. 2,488,739 issued to Mueller, November 22, 1949. A more detailed description of such a pendulum unit will be found in the copending U. S. application of Picardi and Jarosh.

In operation, the two pendulum units are fastened rigidly to the controlled member with their input planes 94 and 96 at right angles to each other as in Fig. 4. A displacement of the controlled member 50 from a plane perpendicular to the vertical will cause one or both of the pendulous masses 160 to hang at an angle from their normal positions in planes 94 and 96 and in the pendulum unit cases 150. This angle will be imposed on the signal generator rotors 170, rigidly coupled to the pendulum shafts 154, and creating two output signals, each proportional to its deflection angle. Since the two pendulum units are mounted at right angles to each other and since each one swings in a vertical plane at right angles to the plane of the other, the two angles thus marked off by a displacement of the controlled member are the same angles that would be marked off if a two-degree-of-freedom pendulum were hung at the intersection of the two planes of swing 94 and 96 and its displacement were projected on them. In other words, the two angles at which the pendulous masses hang, totally described the deviation of the controlled members from a horizon plane or plane pendicular to the vertical. Further explanation of this point will be found in the copending application of Jarosh and Picardi, Ser. No. 222,796 filed April 25, 1951.

However, accelerations of the vehicle carrying the stabilizing unit will also cause the pendulous masses to deflect. To minimize the spurious effects thus caused, the pendulous mass 160 is damped by the float 162 which is surrounded by a viscous damping fluid. In practice best results have been found in fixing the damping so as to give the pendulum unit a characteristic time of about 15 seconds. In this way, for a short acceleration, the pendulum deflects only slightly, but for a permanent displacement the pendulum will slowly deflect to show the full error from the vertical. These pendulum deflections are converted by the signal generators in the pendulum units to electric signals. These signals are used to control the gyros by means of torque generators in the gyro units.

Fig. 6 shows a preferred type of gyro unit such as 52, 54 or 56. It is the same type of unit as shown in Fig. 7 of said copending application, except that a torque generator has been added these gyro units are fully described in the copending application of Jarosh, Haskell and Dunnell, Serial No. 210,246, filed February 9, 1951. It suffices to say here that the gyro unit comprises three sections, a gyro assembly, a signal generator and a torque generator all enclosed in one case shown at 100. The gyro assembly consists of a rotor 102 driven as a synchronous motor about its stator 104 and supported in an inner member 106. The gyro assembly is contained in a float 108. The inner member 106 corresponds to the inner gimbal 4 of Fig. 1 and is mounted on the shaft 110 in bearings 112 so that it can rotate with respect to the case 100 (which itself corresponds to the outer-gimbal 10 of Fig. 1). Inner member rotations with respect to the case are resisted by a damping action (like that provided by the member 16 of Fig. 1). The float 108 is spaced from the case 100 so that there is only a narrow clearance. The entire case is filled with a viscous damping fluid, so that rotations of the inner member are resisted by viscous friction on the float. Balance nuts 120 are provided to compensate for any unbalance in the gyro assembly. The spin, input and output axes of the gyro assembly are shown at S, I and O respectively.

The signal generator consists of a rotor 130 attached to the shaft 110 surrounded by a stator 132 and windings 134. The signal generator is preferably of the type described above in the description of the pendulum unit.

The torque generator consists of a rotor 140, surrounded by a stator 142 and windings 144. The rotor is rigidly attached to the shaft 110, and the stator to the case 100, and the device generates a torque tending to deflect the gyro assembly with respect to the case. The torque generator is preferably of the type described in U. S. Patent No. 2,488,734 issued to Mueller, November 22, 1949.

However, it will be understood that this particular type of gyro unit need not be used. Any convenient means may be substituted provided it includes a single-degree-of-freedom integrating gyroscope, means for generating an electric signal dependent on the deflection of the gyro and means for imposing a torque on the gyro with respect to the outer or stabilized member which is dependent on an electric signal.

When amplified and integrated (the reason for which will be explained below) the pendulum unit outputs are used to activate torque generators (see Fig. 6) in the gyro units. The torque generator produces a torque between its rotor 140 coupled to the gyro float 108 and its stator 142 coupled to the gyro case 100, thus causing a deflection which appears to the gyro signal generator as if the controlled member had deviated from its position in inertial space. This torque may be thought of as an orientation or control torque which orients the gyro to a new orientation in inertial space to which the gyro and associated drivers hold the table. The gyro float 108 revolves with respect to its case 100 and thereby generates an error voltage in the signal generator which drives the gimbal mounting and controlled member in such a way as to nullify the gyro deflection.

To see the interrelation between the gyro deflection and the pendulum deflection, it should be noted as shown in Fig. 4 that the input planes 94 and 96 of the pendulum units 90 and 92 are normal to the input axes $X_g$ and $Y_g$ of the X-axis gyro unit 52 and the Y-axis gyro unit 54. If the member 50 were suddenly to be deflected from its equilibrium position, the process of recovery would be exactly the same as that described in our copending application. The operation is essentially isolated from base motion because the period of the pendulum loop is long enough with respect to the gyro loop period that it does not play any part in short-duration motions like vehicle roll or pitch. The effect of the pendulum and control torques is to hold the gyro orientations over a long period to the vertical instead of to inertial space. To show this continuous change, assume that the airplane is travelling in such a way that if the controlled member 50 were held fixed to inertial space it would rotate from its vertical fix clockwise about the $X_g$-axis only. In such a case only the X-axis pendulum unit 90 would produce a signal output. After amplification that output would take the form of a torque tending to rotate the gyro rotor of the X-axis gyro unit 52 in the same direction as would the torque produced by a counterclockwise rotation about the $X_{cm}$-axis of the controlled member 50. Thus, it would affect the gyro signal generators as if such a rotation had taken place and they would generate an error signal; the servo drives for the gimbals would rotate the controlled member 50 clockwise which would nullify its deviation from the vertical and also the output signal and torque from the pendulum unit. The gyro units' "memory" of inertial space is being slowly and continuously twisted by the control torques from the pendulum units. It should also be noted that this is done in separate X- and Y channels. The above example, showing X-axis operation, can readily be seen to apply to Y-axis operation or to a combination of the two.

It was stated above that the outputs from the pendulum units were integrated before being used to control the gyros, and also that the period of the pendulum control loop was made very long. The reason for this stems from the fact that the pendulum is essentially a detector of acceleration forces, and that, therefore, when the vehicle carrying the stable vertical is accelerated, a spurious acceleration is introduced which affects the pendulum output. It has been shown by mathematical analysis that the pendulum can be almost completely freed from the effects of these spurious accelerations by integrating the pendulum output twice with proper sensitivities in the system and with a specified type of damping. Performing these operations causes the pendulum to approximate the characteristics of an earth's radius pendulum, that is, a pendulum with its pivot at the earth's surface and its bob at the center of the earth. Such a pendulum will always indicate the vertical, regardless of the accelerations of its pivot.

The system shown in Fig. 4 causes the $Z_{cm.}$ axis on the stabilized member 50 always to indicate the vertical. The stabilized member has been made a stable horizontal of high accuracy which is useful in fire control, navigational and guidance systems. However it is to be understood that the apparatus disclosed in the present invention is of a general nature and not limited to the construction of a stable horizontal or vertical. The member 50 may be fixed to any desired set of axes. The apparatus in such a generalized case consists of a gyro stabilization system as described above and in our copending application, combined with means for imposing control torques on the gyros and means for causing those control torques to be dependent on the deviation of the stabilized member 50 from the desired set of axes.

In general, the member 50 may be stabilized about three axes. The stable vertical described stabilizes it only about two, the $X_{cm.}$ and $Y_{cm.}$ axes. As an example of another type of stabilization it will now be shown how the member is controlled about the $Z_{cm.}$ axis by using the axis of the earth's magnetic field as a reference axis.

To show such a complete system of stabilizing a member in three axes, two horizontal axes and one pointing north, it is necessary to refer to Fig. 7. Fig. 7 is a block or functional diagram of the system of Fig. 4 with the magnetic north directional control system added.

The components of Fig. 4 appear in Fig. 7 as labelled blocks, and connections between them are shown as heavy, medium and light lines, indicating, respectively, rigid mechanical connections, power level connections and signal level connections. Thus, the three gyros 52, 54 and 56 are shown by the same numbers in Fig. 7 and are indicated as mounted on the stabilized member 50. Similarly, the pendulum units are shown at 92 and 94 on the member 50. The gimbals and gimbal drives are indicated at 60, 70, 80, 61, 71 and 81. The angle resolvers are shown at 72 and 82, and the base at 84.

Fig. 7 also shows the additional components associated with Fig. 4, as, for example, the amplifiers which raise the signal output of the gyro units to a level to actuate the servo drives to move the stabilized member. These are indicated at 75 and correspond to the amplifier 22 of Fig. 1. The chief addition to Fig. 7 is the control signal generating system shown at 65. As explained in the copending application of Wrigley & Draper, Serial No. 249,182, filed October 17, 1951, to obtain a highly accurate indication of the vertical, it may be desired to perform operations on the electrical outputs which represent pendulum reactions to accelerations. For purposes of illustrating where such operations would be introduced into the circuit the control signal generating system 65 is shown in Fig. 7. Generally, however, it is only necessary to connect the pendulum unit outputs directly to the signal amplifiers 66d, 67d and 68d. As was explained above, in order to use the pendulum units' reaction to random accelerations, it is desired to integrate their output twice and provide a specified type of damping. As is explained in the copending application of Bentley and Draper and the copending application of Draper and Woodbury the gyro units will perform one stage of that integration. The other stage is performed by the control signal generating system. As was explained above, the pendulum units (because they are restricted to one degree of freedom and because they are at right angles to each other) detect deviations of the stabilized member 50 from the reference axes in independent channels. Therefore, their integrating circuits may be kept in separate channels and it is convenient to do so. Each of these channels contains a stage of integration and also a direct channel by-passing the integration. This provides one stage of integration and one stage of the damping necessary to produce damped earth's radius characteristics. The integration channels are indicated schematically at 66b and 67b; the direct channels are shown at 66a and 67a and associated amplifiers are shown at 66c, 67c, 66d and 67d. Integration may be performed by any conventional means, but preferably by motor-generator-tachometer integrators.

The magnetic compass system is indicated at 200. In general, such a system will include not only a magnetic compass but means for correcting its reading for variation and deviation from magnetic north. It is not necessary to discuss here such means since they will be well-known to those skilled in the art. This corrected signal, representing the deviation of the stabilization system or of its vehicle from true north is passed to the control signal generating system 65. A system of direct and integrating channels is provided there for it much like that for the pendulum units. The output signal from the magnetic compass system will generally be proportional to the angular deviation of the $Z_{cm.}$ axis of the controlled member 50 from north. Integration is provided for this output signal in the control signal generating system, the system including, the integrating channel and direct channel acting as a low-pass filter. Also, it has been found convenient to give the loop containing the magnetic compass the same period as the pendulum loops. The direct channel is indicated at 68a, the integrating channel at 68b and associated amplifiers at 68c and 68d.

Again, because the magnetic compass is sensitive to deviations of the base about only one axis, the vertical, and because its associated gyro is also sensitive only to deviations about the vertical, its operation may be considered independent of the pendulum units and the other gyros.

It should also be noted that no angle resolution is needed about the Z-axis because the deviation sensed by the Z-axis gyro will always be the same angle as the error in the desired position of the inner gimbal 60 by virtue of the rigid connection between the stabilized member 50 and the inner gimbal 60.

Fig. 7 can be explained in another way, by reference to Fig. 3. Fig. 3 shows a single pendulum and gyro servo loop, which is suitable for stabilizing to the vertical about one axis, defined by the input axes of the gyro and the pendulum, which are colinear. Fig. 7 represents three such loops (in one of which a magnetic compass is substituted for a pendulum as a detector of deviations from a reference axis). The three loops are joined by a common stabilized member 50 and gimbaling and drives which are interrelated through the resolution system.

It should be pointed out that the apparatus taught by the present invention is general in nature and is not limited to stabilization to the vertical or a geographic direction. Stabilization may be made to any desired axis by combining means for generating an electric signal dependent on deviations from a desired reference axis with means for generating a control torque on the gyros of a stabilization system such as that taught by our copending application. Stabilization can be to any axis from which deviations may be detected; for example, to a radar beam, as in a ground control system or a tracking or homing device, or to points on a loran grid.

Having thus described the invention, we claim:

1. Gyroscopic apparatus comprising a gyroscope sensitive to rotation about an input axis perpendicular to the spin axis, means for mounting the gyroscope with a single degree of freedom about an output axis perpendicular to both the spin axis and the input axis, whereby an output torque proportional to the instantaneous angular velocity of rotation about the input axis is generated, means for generating a resisting torque proportional only to the instantaneous rate of angular motion of the gyroscope about said output axis, a controlled member on which the gyroscope is mounted, means for generating a control torque about the output axis tending to rotate the gyroscope, servo means operated by an angular deflection of the gyroscope and connections from the servo means acting on the controlled member to move the latter toward a position in which the gyroscope is undeflected with respect to the controlled member.

2. Gyroscopic apparatus comprising a gyroscope sensitive to rotation about an input axis perpendicular to the spin axis, means for mounting the gyroscope with a single degree of freedom about an output axis perpendicular to both the spin axis and the input axis, whereby an output torque proportional to the instantaneous angular velocity of rotation about the input axis is generated, a viscous damping member operative on the output axis to produce a resisting torque, a controlled member on which the gyroscope is mounted, means for generating a control torque about the output axis tending to rotate the gyroscope, servo means operated by an angular deflection of the gyroscope and connections from the servo means acting on the controlled member to move the latter toward a position in which the gyroscope is undeflected with respect to the controlled member.

3. Gyroscopic apparatus comprising a gyroscope sensitive to rotation about an input axis perpendicular to the spin axis, a controlled member, means for mounting the gyroscope on the controlled member with a single degree of freedom about an output axis perpendicular to both the spin axis and the input axis, whereby an output torque proportional to the instantaneous angular velocity or rotation about the input axis is generated, means for impressing on the gyroscope about the output axis a control torque dependent on the angular position of the controlled member about a reference axis, means for generating a resisting torque proportional only to the instantaneous rate of angular motion of the gyroscope about said output axis, means defining a null position for the gyroscope about the output axis with respect to the controlled member, servo means operated by an angular deflection of the gyroscope about the output axis from said null position, and connections from the servo means acting on the controlled member to move the latter toward a position in which the gyroscope assumes its null position with respect to the controlled member.

4. Gyroscopic apparatus comprising a gyroscope sensitive to rotation about an input axis perpendicular to the spin axis, a controlled member means for mounting the gyroscope on the controlled member with a single degree of freedom about an output axis perpendicular to both the spin axis and the input axis, whereby an output torque proportional to the instantaneous angular velocity of rotation about the input axis is generated, means for impressing on the gyroscope about the output axis a control torque dependent on the angular position of the controlled member about a reference axis, viscous damping means for generating a resisting torque proportional only to the instantaneous rate of angular motion of the gyroscope about said output axis, means defining a null position for the gyroscope about the output axis with respect to the controlled member, servo means operated by an angular deflection of the gyroscope about the output axis from said null position, and connections from the servo means acting on the controlled member to move the latter toward a position in which the gyroscope assumes its null position with respect to the controlled member.

5. Gyroscopic apparatus comprising a gyroscope sensitive to rotation about an input axis perpendicular to the spin axis, means for mounting the gyroscope with a single degree of freedom about an output axis perpendicular to both the spin axis and the input axis, whereby an output torque proportional to the instantaneous angular velocity of rotation about the input axis is generated, means for generating a resisting torque proportional only to the instantaneous rate of angular motion of the gyroscope about said output axis, a controlled member on which the gyroscope is mounted, means for detecting deviations of the controlled member from a selected reference axis, means for applying to the output axis a control torque of a magnitude determined by the detected deviations, and means operated by a deflection of the gyroscope about its output axis for moving the controlled member to a position in which the gyroscope is undeflected with respect to the controlled member, whereby the controlled member is maintained in a fixed position relative to the reference axis.

6. Gyroscopic apparatus comprising a gyroscope and means for mounting the gyroscope with a single degree of freedom about an output axis perpendicular to the spin axis, whereby an output torque about the output axis is generated by an instantaneous angular velocity of rotation about an input axis perpendicular to both the spin and output axes, means for generating a torque resisting said output torque and of a magnitude substantially proportional only to the angular velocity of rotation of the output axis, a controlled member on which the gyroscope is mounted, means for rotating the controlled member, means operated by a deflection of the gyroscope about its output axis to activate said rotating means to rotate the controlled member toward a position in which the gyroscope is undeflected with respect to the controlled member, reference input means, and torque-generating means responsive to the reference input means to apply a torque tending to rotate the gyroscope about its output axis.

7. Gyroscopic apparatus comprising a gyroscope and means for mounting the gyroscope with a single degree of freedom about an output axis perpendicular to the spin axis, whereby an output torque about the output axis is generated by an instantaneous angular velocity of rotation about an input axis perpendicular to both the spin and output axes, viscous damping means for generating a torque resisting said output torque and of a magnitude proportional only to the angular velocity of rotation of the output axis, a controlled member on which the gyroscope is mounted, means for rotating the controlled member, means operated by a deflection of the gyroscope about its output axis to activate said rotating means to rotate the controlled member toward a position in which the gyroscope is undeflected with respect to the controlled member, reference input means, and torque-generating means responsive to the reference input means to apply a torque tending to rotate the gyroscope about its output axis.

8. Gyroscopic apparatus comprising a gyroscope and means for mounting the gyroscope with a single degree of freedom about an output axis perpendicular to the spin axis, whereby an output torque about the output axis is generated by an instantaneous angular velocity of rotation about an input axis perpendicular to both the spin and output axes, means for generating a torque resisting said output torque and of a magnitude substantially proportional only to the angular velocity of rotation of the output axis, a controlled member on which the gyroscope is mounted, means for rotating the controlled member, means operated by a deflection of the gyroscope about its output axis to activate said rotating means to rotate the controlled member toward a position in which the gyroscope is undeflected with respect to the controlled member, means for detecting deviations of the controlled member from a selected reference axis, and means responsive to said detecting means to generate a torque tending to rotate the gyroscope about its output axis.

9. Gyroscopic apparatus comprising a gyroscope and means for mounting the gyroscope with a single degree of freedom about an output axis perpendicular to the spin axis, whereby an output torque about the output axis is generated by an instantaneous angular velocity of rotation about an input axis perpendicular to both the spin and output axes, viscous damping means for generating a torque resisting said output torque and of a magnitude proportional only to the angular velocity of rotation of the output axis, a controlled member on which the gyroscope is mounted, means for rotating the controlled member, means operated by a deflection of the gyroscope about its output axis to activate said rotating means to rotate the controlled member toward a position in which the gyroscope is undeflected with respect to the controlled member, means for detecting deviations of the controlled member from a selected reference axis, and means responsive to said detecting means to generate a torque tending to rotate the gyroscope about its output axis.

10. Gyroscopic apparatus comprising a gyroscope and means for mounting the gyroscope with a single degree of freedom about an output axis perpendicular to the spin axis, whereby an output torque about the output axis is generated by an instantaneous angular velocity of rotation about an input axis perpendicular to both the spin and output axes, means for generating a torque resisting said output torque and of a magnitude substantially proportional only to the angular velocity of rotation of the output axis, a controlled member on which the gyroscope is mounted, means generating a torque tending to deflect the gyroscope, the magnitude of the torque being dependent on the deviation of the controlled member from a reference axis, signal generating means to produce an electric signal dependent on deflections of the output axis with respect to the controlled member, and servo means actuated in response to the signal generating means to rotate the controlled member toward a position in which the gyroscope is undeflected.

11. Gyroscopic apparatus comprising a gyroscope and means for mounting the gyroscope with a single degree of freedom about an output axis perpendicular to the spin axis, whereby an output torque about the output axis is generated by an instantaneous angular velocity of rotation about an input axis perpendicular to both the spin and output axes, means for generating a torque resisting said output torque and of a magnitude substantially proportional only to the angular velocity of rotation of the output axis, a controlled member on which the gyroscope is mounted, deflecting means for generating a control torque tending to deflect the gyroscope about its output axis, means for detecting deviations of the controlled member from a reference axis and generating an electric input for the deflecting means dependent on said deviations, signal generating means to produce an electric signal dependent on deflections of the output axis with respect to the controlled member, and servo means actuated in response to the signal generating means to rotate the controlled member toward a position in which the gyroscope is undeflected.

12. Gyroscopic apparatus comprising a gyroscope and means for mounting the gyroscope with a single degree of freedom about an output axis perpendicular to the spin axis, whereby an output torque about the output axis is generated by an instantaneous angular velocity of rotation about an input axis perpendicular to both the spin and output axes, means for generating a torque resisting said output torque and of a magnitude substantially proportional only to the angular velocity of rotation of the output axis, a controlled member on which the gyroscope is mounted, means generating a control torque tending to deflect the gyroscope about its output axis, the magnitude of the torque being dependent on the deviation of the controlled member from a reference axis, gimbal supports for the controlled member, servo means to rotate the gimbal supports of the controlled member, signal generating means to produce a signal dependent on output deflections of the gyroscope, and connecting circuits causing said signal to activate the servo means to rotate the controlled member toward a position in which the gyroscope is undeflected with respect to the controlled member.

13. Gyroscopic apparatus comprising a gyroscope and means for mounting the gyroscope with a single degree of freedom about an output axis perpendicular to the spin axis, whereby an output torque about the output axis is generated by an instantaneous angular velocity of rotation about an input axis perpendicular to both the spin and output axes, means for generating a torque resisting said output torque and of a magnitude substantially proportional only to the angular velocity of rotation of the output axis, a controlled member on which the gyroscope is mounted, deflecting means for generating a control torque tending to deflect the gyroscope about its output axis, means for detecting deviations of the controlled member from a reference axis and generating an electric input for the deflecting means dependent on said deviations, gimbal supports for the controlled member, servo means to rotate the gimbal supports of the controlled member, signal generating means to produce a signal dependent on output deflections of the gyroscope, and connecting circuits causing said signal to activate the servo means to rotate the controlled member toward a position in which the gyroscope is undeflected with respect to the controlled member.

14. Gyroscopic apparatus comprising two gyroscopes, means for mounting each gyroscope with a single degree of freedom about an output axis perpendicular to its spin axis, whereby an output torque about the output axis is generated by an instantaneous angular velocity of rotation about an input axis perpendicular to the spin and output axes, viscous damping means to resist output deflections by a torque substantially proportional to the rate of output deflection and independent of the amount of output deflection, a controlled member on which the two gyroscopes are mounted so that their input axes define a plane in space, means for detecting deviations of the controlled member from a reference axis, means activated by said detecting means for generating torques tending to deflect the gyroscopes about their output axes, means for rotating the controlled member about two axes, and means operated by deflections of the gyroscopes about their output axes to activate the rotating means to rotate the controlled member toward a position in which the gyroscopes are undeflected with respect to the controlled member.

15. Gyroscopic apparatus comprising two gyroscopes, means for mounting each gyroscope with a single degree of freedom about an output axis perpendicular to its spin axis, whereby an output torque about the output axis is generated by an instantaneous angular velocity of rotation about an input axis perpendicular to the spin and output axes, viscous damping means to resist output deflections by a torque substantially proportional to the rate of output deflection and independent of the amount of output deflection, a controlled member on which the two gyroscopes are mounted so that their input axes define a plane in space, pendulum means for detecting deviations of the controlled member from the vertical, means activated by said pendulum means for generating torques tending to deflect the gyroscopes about their output axes, means for rotating the controlled member about two axes, and means operated by deflections of the gyroscopes about their output axes to activate the rotating means to rotate the controlled member toward a position in which the gyroscopes are undeflected with respect to the controlled member.

16. Gyroscopic apparatus comprising three gyroscopes, means for mounting each gyroscope with a single degree of freedom about an output axis perpendicular to its spin axis, whereby a torque about the output axis is generated by an instantaneous angular velocity of rotation about an input axis perpendicular to the spin and output axes, means for generating a resisting torque proportional only to the instantaneous rate of angular motion of the gyroscope about said output axis, a controlled member on which the three gyroscopes are mounted so that their input axes define an orientation in space, means for detecting deviations of the controlled member from a reference axis, means activated by said detecting means for generating torques tending to deflect the gyroscopes about their output axes, means for rotating the controlled member about three axes, and means operated by deflections of the gyroscopes about their output axes to activate the rotating means to rotate the controlled member toward a position in which the gyroscopes are undeflected with respect to the controlled member.

17. Gyroscopic apparatus comprising three gyroscopes, means for mounting each gyroscope with a single degree of freedom about an output axis perpendicular to its spin axis, whereby an output torque about the output axis is generated by an instantaneous angular velocity of rotation about an input axis perpendicular to the spin and output axes, means for generating a resisting torque proportional only to the instantaneous rate of angular motion of the gyroscope about said output axis, a controlled member on which the gyroscopes are mounted so that their input axes define an orientation in space, gimbals supporting the controlled member to give it three degrees of rotational freedom, means for detecting deviations of the controlled member from a reference axis, means activated by said detecting means for generating torques tending to deflect the gyroscopes about their output axes, servo means for rotating said gimbals, signal generating means for producing three signals dependent on the deflections of the gyroscopes, connecting circuits for the signals to activate the servo means to rotate the controlled member toward a position in which all the gyros are undeflected with respect to the controlled member.

18. Gyroscopic apparatus comprising a single-degree-of-freedom integrating gyroscope having a spin axis, an input axis and an output axis, a controlled member on which the gyroscope is mounted, a servo loop including the gyroscope and controlled member to tend to maintain the gyroscope undeflected with respect to the controlled member, means for detecting deviation of the controlled member from a selected reference axis, means for applying a control torque about the output axis of the gyroscope, and a control loop including said detecting means and torque-generating means, the control loop having a longer period than the servo loop.

19. Gyroscopic apparatus comprising a single-degree-of-freedom integrating gyroscope having a spin axis, an input axis and an output axis, a controlled member on which the gyroscope is mounted, a servo loop including the gyroscope and controlled member to tend to maintain the gyroscope undeflected with respect to the controlled member, means for detecting deviations of the controlled member from a selected reference axis, means for applying a control torque about the output axis of the gyroscope, and a control loop including said detecting means and torque-generating means, the servo loop having a short period and the control loop having a long period.

20. Gyroscopic apparatus comprising a controlled member, three single-degree-of-freedom gyroscopes mounted on the controlled member with their input axes (denoted X, Y and Z) mutually perpendicular, gimbal supports for the controlled member, servo means responsive to gyroscope deflections to move the controlled member to a position in which the gyros are undeflected, restraining means for each of the gyroscopes for restraining deflections by torques proportional only to the rate of deflection, two single-degree-of-freedom pendulums mounted on the controlled member, pivoted about axes parallel to the X and Y axes, torque-generating means for applying torques tending to deflect the X and Y gyros dependent on the pendulum deflections about their respective input axes.

21. Gyroscopic apparatus comprising a controlled member, three single-degree-of-freedom gyroscopes mounted on the controlled member with their input axes (denoted X, Y and Z) mutually perpendicular, gimbal supports for the controlled member, servo means responsive to gyroscope deflections to move the controlled member to a position in which the gyros are undeflected, restraining means for each of the gyroscopes for restraining deflections by torques proportional only to the rate of deflection, two single-degree-of-freedom pendulums mounted on the controlled member, pivoted about axes parallel to the X and Y axes, torque-generating means for applying torques tending to deflect the X and Y gyros dependent on the pendulum deflections about their respective input axes, and torque-generating means for applying torques tending to deflect the Z gyro dependent on the deviation of the controlled member from a reference position in the horizontal plane.

References Cited in the file of this patent

UNITED STATES PATENTS

| Number | Name | Date |
|---|---|---|
| 1,501,886 | Abbot | July 15, 1924 |
| 1,735,058 | Schuler | Nov. 12, 1929 |
| 1,930,082 | Boykow | Oct. 10, 1933 |
| 1,940,387 | Boykow | Dec. 19, 1933 |
| 1,947,562 | Marmonier | Feb. 20, 1934 |
| 2,488,734 | Mueller | Nov. 22, 1949 |
| 2,513,738 | Noxon | July 4, 1950 |
| 2,517,612 | Varian | Aug. 8, 1950 |
| 2,584,125 | Haglund | Feb. 5, 1952 |
| 2,591,697 | Hays | Apr. 8, 1952 |
| 2,592,417 | Hale | Apr. 8, 1952 |